(12) United States Patent
Sato et al.

(10) Patent No.: US 6,293,483 B1
(45) Date of Patent: Sep. 25, 2001

(54) BRAKING DEVICE FOR DUAL-BEARING REEL

(75) Inventors: Jun Sato; Kenichi Kawasaki, both of Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/610,584

(22) Filed: Jul. 5, 2000

(30) Foreign Application Priority Data

Jul. 7, 1999 (JP) ................................................. 11-193073

(51) Int. Cl.[7] .................................................. A01K 89/02
(52) U.S. Cl. ............................................................ 242/289
(58) Field of Search .................................. 242/289, 302, 242/303, 304

(56) References Cited

U.S. PATENT DOCUMENTS

| | | | | |
|---|---|---|---|---|
| 4,390,140 | * | 6/1983 | Karlsson et al. | 242/289 |
| 5,308,021 | * | 5/1994 | Ikuta | 242/289 |
| 5,362,011 | * | 11/1994 | Sato | 242/289 |
| 5,372,324 | * | 12/1994 | Sato | 242/289 |
| 5,692,693 | * | 12/1997 | Yamaguchi | 242/289 |
| 5,950,949 | * | 9/1999 | Cockerham | 242/289 |
| 5,984,221 | * | 11/1999 | Kim | 242/289 |
| 5,996,921 | * | 12/1999 | Hogaki et al. | 242/289 |
| 6,003,798 | * | 12/1999 | Kim | 242/289 |
| 6,196,485 | * | 3/2001 | Sato | 242/289 |

* cited by examiner

Primary Examiner—Emmanuel M. Marcelo
(74) Attorney, Agent, or Firm—Shinjyu Global IP Counselors, LLP (57) ABSTRACT

A dual-bearing reel centrifugal braking mechanism 23 that enables braking force to be adjusted readily and accurately. The centrifugal braking mechanism 2, for braking the spool 12 rotatively provided in a reel unit 1, and includes a brake element 51, a rotor 52, a plurality of shifting members 53, and a shifting mechanism 54. The brake element 51 is fixed to the reel body. The rotor 52 is disposed being concentric with the brake element 51. The rotor 52 is a member which rotates together with the spool 12 and is capable of moving in a direction along the axial direction of the spool 12 with respect of the reel unit 1. The plurality of shifting members 53 is attached to the rotor 52 in a movable manner so that each member may be moved towards the brake element 51 by a centrifugal force generated by the rotation of the spool 12. The plurality of shifting members 53 is also members which are capable of making contact with the brake element 51 with a different number of them during a braking operation by the movement of the rotor 52 in the axial direction. The shifting mechanism 54 is a mechanism for reciprocating the rotor 52 in the axial direction.

11 Claims, 9 Drawing Sheets

BRAKING DEVICE FOR DUAL-BEARING REEL

BACKGROUND OF THE INVENTION

1. Technical Field

The present invention relates to braking devices, in particular to braking devices on dual-bearing reels for braking the spool supported rotatively in the reel unit.

2. Description of Related Art

In dual-bearing reels referred to as bait reels, utilized mainly for lure fishing, generally braking force is made to act on the spool so that backlash, wherein the rotational speed of the spool when casting is faster than the line wind-out speed, does not occur. As examples of this class of braking device centrifugal braking mechanisms that employ centrifugal force developing from spool rotation to brake the spool, and casting control mechanisms that mechanically brake the spool shaft by grasping either end of the spool spindle are known.

Japanese Laid-Open patent application No. 10-304798 discloses a centrifugal braking mechanism in this class of braking device, wherein the braking force is adjustable from the outer side of the reel body.

The centrifugal braking mechanism is furnished with a rotary member that rotates linked with the spool; a plurality of shifting members disposed in radial fashion on the rotary member; a brake member that comes into contact with the tips of the braking members; and a braking force adjustment mechanism. The rotor is fixed to the spool spindle for the linked rotation with the spool. The shifting members of the plurality are fitted to, and pivotable around axes along chord directions of, the rotating member; by centrifugal force they pivot within planes that pass through the axis of the spool. The brake member is non-rotatably fitted to the reel body but able to travel in the spool spindle direction, and is brought into contact with shifting members that pivot under centrifugal force. A mechanism that shifts the brake member back and forth in the spool spindle direction, the braking force adjustment mechanism is for adjusting braking force that contacting of the shifting members on the brake member generates.

In the above-noted conventional centrifugal braking mechanism, when the spool rotates centrifugal force acts on the shifting members, and the shifting members pivot heading spool-spindle outward. The shifting members then contact the brake member, which brakes the spool. Shifting the brake member in the axial direction by means of the braking force adjustment mechanism adjusts the braking force by altering its moment according to the pivotal angle of the shifting members during contact with the brake member.

Casting control mechanisms, on the other hand, are furnished with friction plates disposed on either end of, as a pair sandwiching, the spool spindle, and a cap provided screwmated to the reel body in order to regulate the grasping force by the friction plates. In the casting control mechanism, the spool shaft is braked by turning the cap, which presses the spool spindle more towards the friction plate on the other end than the friction plate on the one end.

In the conventional braking devices noted above, the spool spindle shifts slightly when adjusting the braking force with the casting control mechanism. When the spool shaft shifts, this accompanied by the rotary member of the centrifugal braking mechanism also shifting axially, along with its shifting members.

When the shifting members shift axially, the clearance between them and the brake member--fitted to be shiftable on the reel body--becomes different from the pre-shift clearance, and the shifting-member pivotal angle changes. When adjusting the braking force with the casting control mechanism, therefore, the braking force from the centrifugal braking mechanism will sometimes change even if the brake member is disposed in the same position axially. Accordingly, the above-noted conventional, exteriorly adjustable centrifugal braking mechanism leaves the concern that the braking force cannot be adjusted very accurately when the spool spindle shifts.

SUMMARY OF THE INVENTION

An object of the present invention is to facilitate, and enable to be accurately performed the operation of adjusting the braking force in dual-bearing reel braking devices.

Another object of the present invention is to ensure the accuracy of the braking force adjustment in braking devices for dual-bearing fishing reels regardless of casting control mechanism adjustment.

The braking device for a dual-bearing reel according to a first aspect of the present invention is a device for braking a spool which is rotatably provided in a reel body and includes a braking member, a rotating member, a plurality of moving members, and a moving means. The braking member is fixed to the reel body. The rotating member is disposed being concentric with the braking member. The rotating member is a member which rotates together with the spool and is capable of moving in a direction along the axial direction of the spool with respect of the reel body. The plurality of moving members is attached to the rotating member in a movable manner so that each member may be moved towards the braking member by a centrifugal force generated by the rotation of the spool. The plurality of moving members is also members which are capable of making contact with the braking member in a different-frictional state, as a whole, during a braking operation by the movement of the rotating member in the axial direction. The moving means is a means for reciprocating the rotating member in the axial direction.

In this braking device, when the spool rotates, the rotating member rotates together with the spool and the moving members move towards the braking member due to a centrifugal force. Then, when the moving members make contact with the braking member, a braking force, which is generated by a friction between the moving members and the braking member, is applied to the rotating member to brake the spool. At that time, the degree of braking force may be changed in accordance with the position of the rotating member in the axial direction which changes a friction state between the moving members and the braking member by changing, for instance, the number of the moving members that make contact with the braking member or a pressing force of the moving members against the braking member. Accordingly, an adjustment operation of the braking force may be easily performed by moving the rotating member in the axial direction using the moving means. Also, since the rotating member is movable with respect to the reel body in a direction along the spool axial direction, it is also relatively movable with respect to the spool shaft. For this reason, when the spool shaft is moved in the axial direction by such factors as an operation of the casting control mechanism, the rotating member does not move in the axial direction and the positional relationship between the rotating member and the braking member in the axial direction is not changed. As a result, a predetermined braking force is not changed when the spool shaft is moved, and the adjustment operation of the braking force may be carried out accurately.

The braking device for a dual-bearing reel according to a second aspect of the invention is a device as set forth in the foregoing first aspect, and further wherein the plurality of moving members are placed at the inner side with respect to the braking member and attached to the rotating member so that the number of the moving members which make contact with the braking member changes in accordance with the movement of the rotating member in the axial direction. In this braking device, when the rotating member is moved in the axial direction, the number of the moving members which make contact with the braking member is changed and the braking force is varied. In this case, since the braking force is adjusted by changing the number of the moving members, the degree of the braking force is changed stepwise and the change in the braking force becomes conspicuous.

According to a third aspect, the braking device is as described in the above second aspect, yet further wherein the braking member has a braking surface spreading in a direction approaching to the moving members, and the plurality of moving members are radially attached to the rotating member in a movable manner in the radius direction to a movement limit position which differs for each of the moving members. In this braking device, the braking surface of the braking member is formed as a tapered slant surface so that the distance to the rotating member may be changed in the axial direction, and the number of the moving members that make contact with the braking surface is changed in accordance with the position of the rotating member in the axial direction by changing the movement limit position for each of the moving members.

According to fourth aspect of the invention the braking device for a dual-bearing reel is a device as described in the second aspect above, and further wherein the braking member has a braking surface of a cylindrical shape, and the plurality of moving members are radially attached to the rotating member in a movable manner in the radius direction so that a respective contacting position to the braking member may be differed in the axial direction. In this braking device, the number of the moving members, which move in the radius direction, that make contact with the braking surface is varied in accordance with the position of the rotating member in the axial direction by changing the position of the moving members at which they make contact with the braking surface in the axial direction.

In a fifth aspect of the present invention the braking device for a dual-bearing reel is as set forth in the foregoing first aspect, yet additionally wherein the braking member has a braking surface of a cylindrical shape, and each of the plurality of moving members is attached to the rotating member with a space between each other in a circumferential direction in a manner capable of pivoting around a respective pivot along a chord direction, the moving members making contact with the braking member at different positions in the spool axial direction. In this braking device, the number of the moving members that make contact with the braking surface is changed in accordance with the position of the rotating member in the axial direction by changing the position of the moving members pivoting at which they make contact with the braking surface in the axial direction.

The braking device for a dual-bearing reel according to a sixth aspect is also as set forth in the first aspect noted above, yet further wherein the braking member has a braking surface of an annular shape orthogonal to the spool axis, the braking surface being provided so as to be opposed to the moving members with space therebetween in the axial direction, and the plurality of moving members are attached to the rotating member with a space between each other in the circumferential direction so that a pressing force against the braking member may be changed in accordance with the movement of the rotating member in the axial direction, the moving members being attached in a manner capable of pivoting around a respective pivot along a chord direction. In this braking device, when the distance between the pivoting center of the moving members pivoting and the braking surface is changed, the angle of the pivoting moving members with respect to the braking surface that is created when the moving members make contact with the braking surface is changed and the pressing force is varied.

In a seventh aspect, the braking device for a dual-bearing reel is a device as set forth in the foregoing aspects, and moreover wherein the spool is fixed to a spool shaft, the rotating member is non-rotatably, and in a non-movable manner in the axial direction, coupled to an inner ring of a bearing for supporting the spool shaft in a rotatable manner with respect to the reel body, the rotating member also being non-rotatably coupled to the spool shaft in a movable manner in the axial direction, and the moving means is non-rotatably coupled to an outer ring of the bearing in a non-movable manner in the axial direction, the moving means being capable of reciprocating the rotating member in the axial direction via the bearing. In this braking device, when the moving means moves the outer ring of the bearing in the axial direction, the inner ring is moved in the axial direction via a rolling element provided between the inner and outer rings and the rotating member is moved together with the inner ring. At that time, although the inner ring rotates together with the rotating member which rotates together with spool, the outer ring does not rotate. For this reason, the braking force may be easily adjusted even if the rotating member is rotating.

The braking device for a dual-bearing reel according to an eighth aspect of the invention is as set forth in any of the foregoing aspects, yet further wherein the moving means includes a rotary member rotatably provided with the reel body, and a rotary cam mechanism for moving the rotating member by converting the rotation of the rotary member to the movement of the rotating member in the spool axial direction. In this braking device, when the rotary cam mechanism is rotated by the rotary member, the rotating member is moved in the spool axial direction and the braking force is adjusted. In this case, since the rotating movement is converted to a linear movement by using the simple cam mechanism, the configuration of the moving means may be simplified.

In a ninth aspect of the present invention, the braking device for a dual-bearing reel is a device as described in the above-mentioned seventh or eighth aspects, and still further including a casting control mechanism for braking the spool by holding the spool shaft. In this braking device, the braking force of the braking member does not change when the spool shaft is moved in the axial direction by the operation of the casting control mechanism.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Overall Structure

Figure 1:
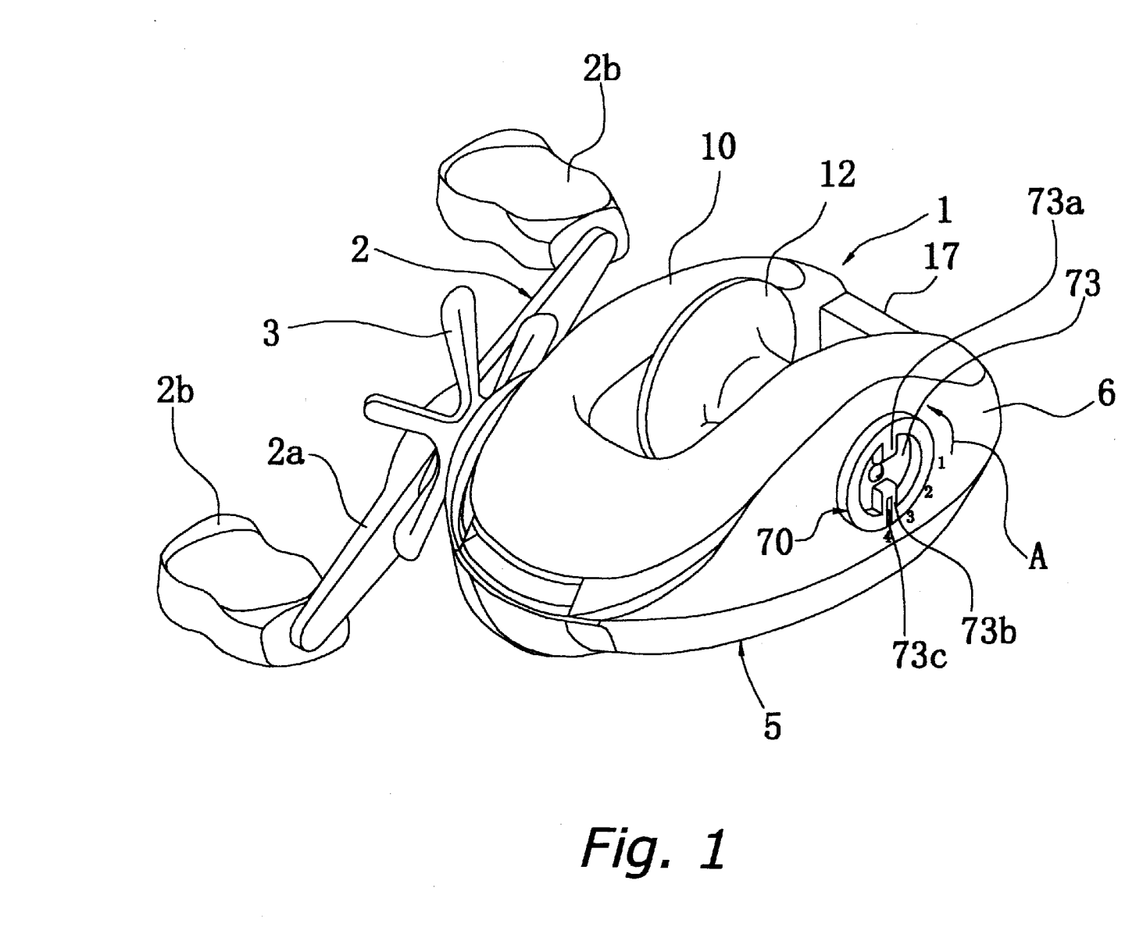
FIG. 1 is a oblique view of a dual-bearing reel to which an embodiment of the present invention is adapted.

FIG. 1 is a perspective view of a dual-bearing reel according to an embodiment of the present invention.

The dual-bearing reel shown in the figure is a bait reel mainly used for lure fishing and includes a reel unit 1, a handle 2, and a star drag 3 for adjusting drag. The handle 2 is provided for rotating a spool and is disposed at one side of the reel unit 1. The star drag 3 is disposed at the reel unit 1 side of the handle 2. The handle 2 is of a double handle type having a plate-type arm portion 2a and holding portions 2b, each of which is rotatably attached to a respective end of the arm portion 2a. The outer surface of the arm portion 2a of the handle 2 is a smooth jointless surface so that a fishing line is hardly twined around.

Figure 2:
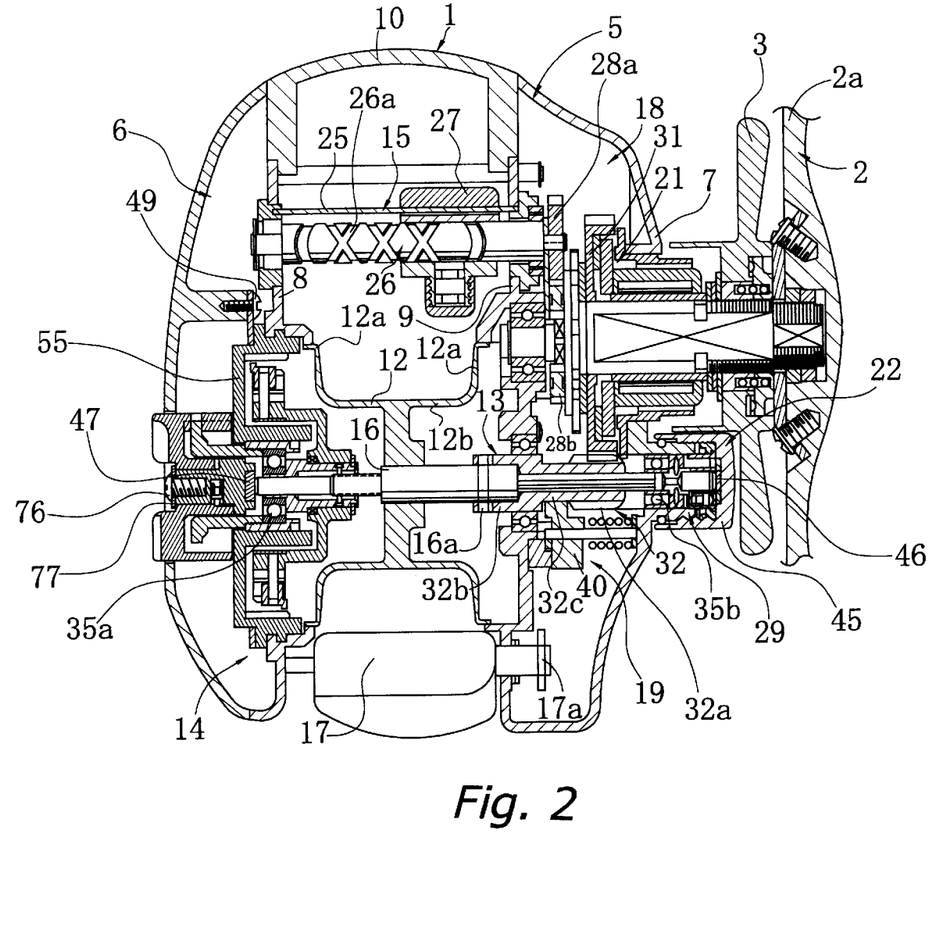
FIG. 2 a view in horizontal section through the FIG. 1 dual-bearing reel.

As shown in FIG. 2, the reel unit 1 includes a frame 5, a first side cover 6, a second side cover 7, and a thumb rest 10. The first side cover 6 and the second side cover 7 are disposed at a respective side of the frame 5. The thumb rest 10 is disposed at an upper portion of the frame 5. The frame 5 includes a pair of side plates 8 and 9, which are disposed so as to be opposed to each other with a predetermined space therebetween, and a plurality of connecting members (not shown in figures), each of which connects the side plates 8 and 9.

The second side cover 7 which is located at the handle 2 side is fixed to the side plate 9 by screws so that it may be detached from the side plate 9. The first side cover 6 which is located at the opposite side of the handle 2 is attached to the side plate 8 of the frame 5 in a detachable manner by a bayonet coupling 14. An opening 8a for passing through the spool 12 is formed on the side plate 8 located at the opposite side of the handle 2.

The spool 12, a level wind mechanism 15, and a clutch operation lever 17 are disposed inside the frame 5. The level wind mechanism 15 is provided for uniformly winding a fishing line around the spool 12. The clutch operation lever 17 may function as a thumb rest during a thumbing. A gear mechanism 18, a clutch mechanism 13, a clutch switching mechanism 19, a drag mechanism 21, and a casting control mechanism 22 are disposed in the space between the frame 5 and the second side cover 7. The gear mechanism 18 transmits a rotational force from the handle 2 to the spool 12 and the level wind mechanism 15. The clutch switching mechanism 19 switches the clutch mechanism 13 in accordance with the operation of the clutch operation lever 17. The drag mechanism 21 brakes the spool 12 when the fishing line is released. The casting control mechanism 22 brakes the spool shaft 16 by holding the both ends thereof. Also, a centrifugal braking mechanism 23 which prevents backlash when casting a fishing line is disposed at the opening 8a.

The spool 12 has flange portions 12a, each of which has a plate shape, at both sides thereof and a spool body 12b of a cylindrical shape is provided between the flange portions 12a. Also, the spool 12 has a boss portion 12c of a cylindrical shape which is integrally formed with the spool body 12b and located at the inner side thereof. The spool 12 may be fixed to the spool shaft 16 which penetrates through the boss portion 12c, in a non-rotatable manner by, for instance, a serration engagement.

The spool shaft 16 penetrates the side plate 9 and extends outside the second side cover 7. The extended end of the spool shaft 16 is rotatably supported by a bearing 35b of a boss portion 29 which is provided in the second side cover 7. Also, the other end of the spool shaft 16 is rotatably supported by a bearing 35a in the centrifugal braking mechanism 23.

The level wind mechanism 15 includes a guiding pipe 25, a worm shaft 26, and a line guide 27. The guiding pipe 25 is fixed between the pair of the side plates 8 and 9. The worm shaft 26 is rotatably supported in the guiding pipe 25. A gear 28a, which forms a part of the gear mechanism 18, is fixed to one end of the worm shaft 26. Also, a spiral groove 26a is formed on the worm shaft 26 and the line guide 27 is engaged with the spiral groove 26a. Accordingly, the line guide 27 is reciprocated by the guiding pipe 25 when the worm shaft 26 rotates via the gear mechanism 18. A fishing line is inserted in the line guide 27 and uniformly reeled in around the spool 12.

The gear mechanism 18 includes a main gear 31, a pinion gear 32, the above-mentioned gear 28a, and a gear 28b. The main gear 31 is coupled to a handle shaft 30. The pinion gear 32 has a cylindrical shape and is engaged with the main gear 31. The gear 28a is coupled to one end of the worm shaft 26. The gear 28b is coupled to the handle shaft 30 in a non-rotatable manner and is engaged with the gear 28a.

The pinion gear 32 is a cylindrical member which is disposed by penetrating the side plate 9. The spool shaft 16 penetrates the center of the pinion gear 31 and the pinion gear 32 is coupled to the spool shaft 16 in a movable manner in the axial direction. The pinion gear 32 includes a teeth portion 32a and an engaging portion 32b. The teeth portion 32a is located at a right-hand side outer periphery portion of the pinion gear 32 in FIG. 2 and engages with the main gear 31. The engaging portion 32b is formed at the other side of the pinion gear 32. A concave portion 32c is provided between the teeth portion 32a and the engaging portion 32b. The engaging portion 32b includes a concave groove formed on an end surface of the pinion gear 32 and a clutch pin 16a which penetrates the spool shaft 16 in the radius direction is engaged therewith. In this embodiment, when the pinion gear 32 is moved outwardly and the concave groove of the engaging portion 32b is disengaged from the clutch pin 16a of the spool shaft 16, the rotation of the handle shaft 30 is not transmitted to the spool 12. The clutch mechanism 13 is constituted by the concave groove of the engaging portion 32b and the clutch pin 16a.

As shown in FIG. 2, the clutch operation lever 17 is disposed at the back of the spool 12 between the pair of the side plates 8 and 9. An elongated hole (not shown) is provided with the side plates 8 and 9 of the frame 5 and a clutch cam (not shown) for coupling the clutch operation lever 17 penetrates the elongated hole. Thus, the clutch operation lever 17 may be slidably moved in an up and down direction along the elongated hole. The clutch switching mechanism 19 includes a clutch yoke 40. The clutch switching mechanism 19 moves the clutch yoke 40 parallel to the axis of the spool shaft 16 when the clutch operation lever 17 is rotated. Also, the clutch switching mechanism 19 moves the clutch yoke 40 so that the clutch mechanism 13 is automatically turned on when the handle shaft 30 is rotated in a line reeling in direction.

In this configuration, the pinion gear 32 is located at an inner clutch engaging position in a normal state so that the engaging portion 32b is engaged with the clutch pin 16a of the spool shaft 16 to be a clutch-on state. On the other hand, when the pinion gear 32 is moved outwardly by the clutch yoke 40, the engaging portion 32b is disengaged from the clutch pin 16a to be a clutch-off state.

The casting control mechanism 22 includes a cap 45, a friction plate 46, and a friction plate 47. The cap 45 has a cylindrical shape with a bottom and is engaged with a male screw portion formed on an outer periphery of the boss portion 29. The friction plate 46 is attached to the bottom of the cap 45. The friction plate 47 is attached to a brake case 55 (described later). Either friction plate 46 and 47 contacts either end of the spool shaft 16 to grip (pinch) the spool shaft 16. The braking force may be adjusted by rotating the cap 45 to adjust the gripping force generated by both the friction plates 46 and 47. When the braking force is adjusted by the casting control mechanism 22, the spool shaft 16 is slightly shifted in the axial direction since the friction plate 46 which is attached to the cap 45 presses the spool shaft 16 against the-friction plate 47.

Centrifugal Braking Mechanism Configuration

Figure 3:
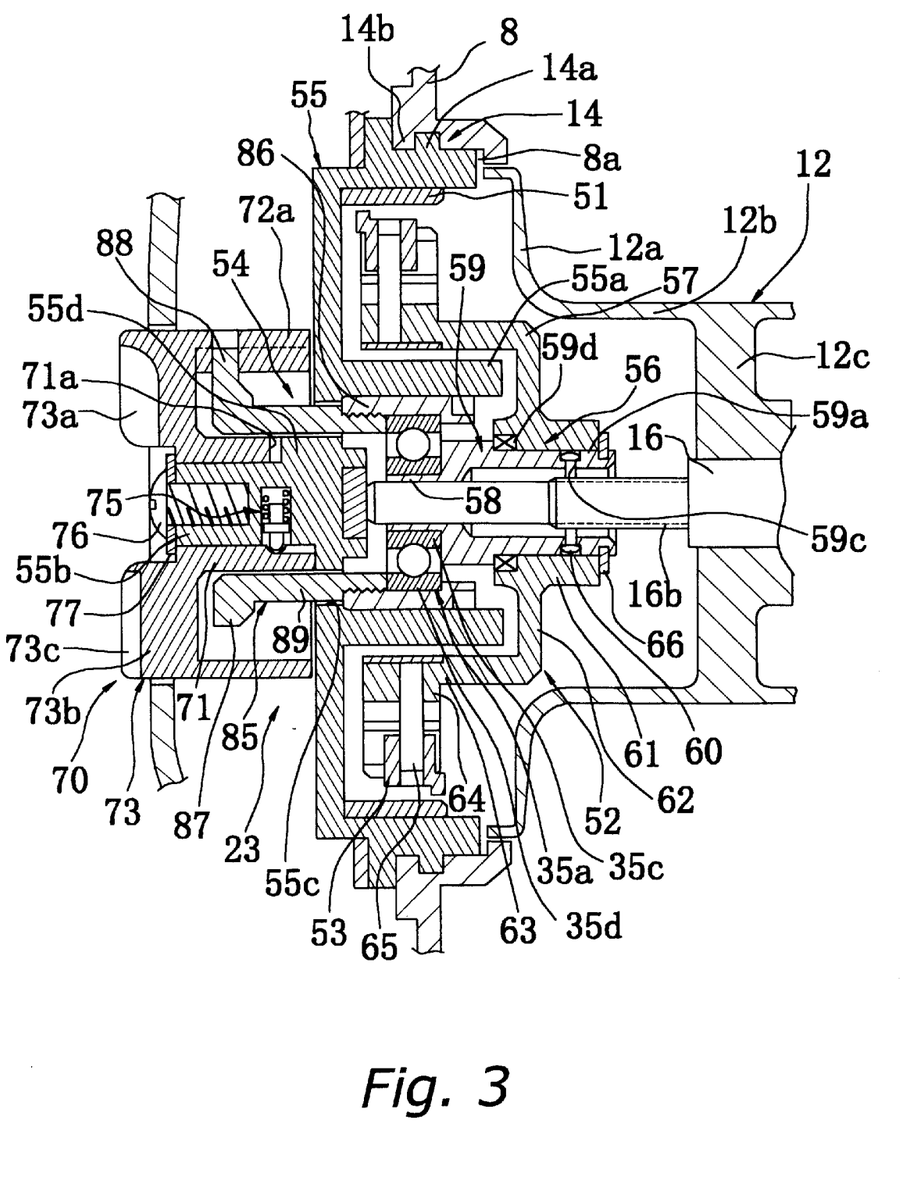
FIG. 3 fragmentary, enlarged sectional view corresponding to FIG. 2 and depicting details of a centrifugal braking mechanism of the dual-bearing reel.
Figure 4:
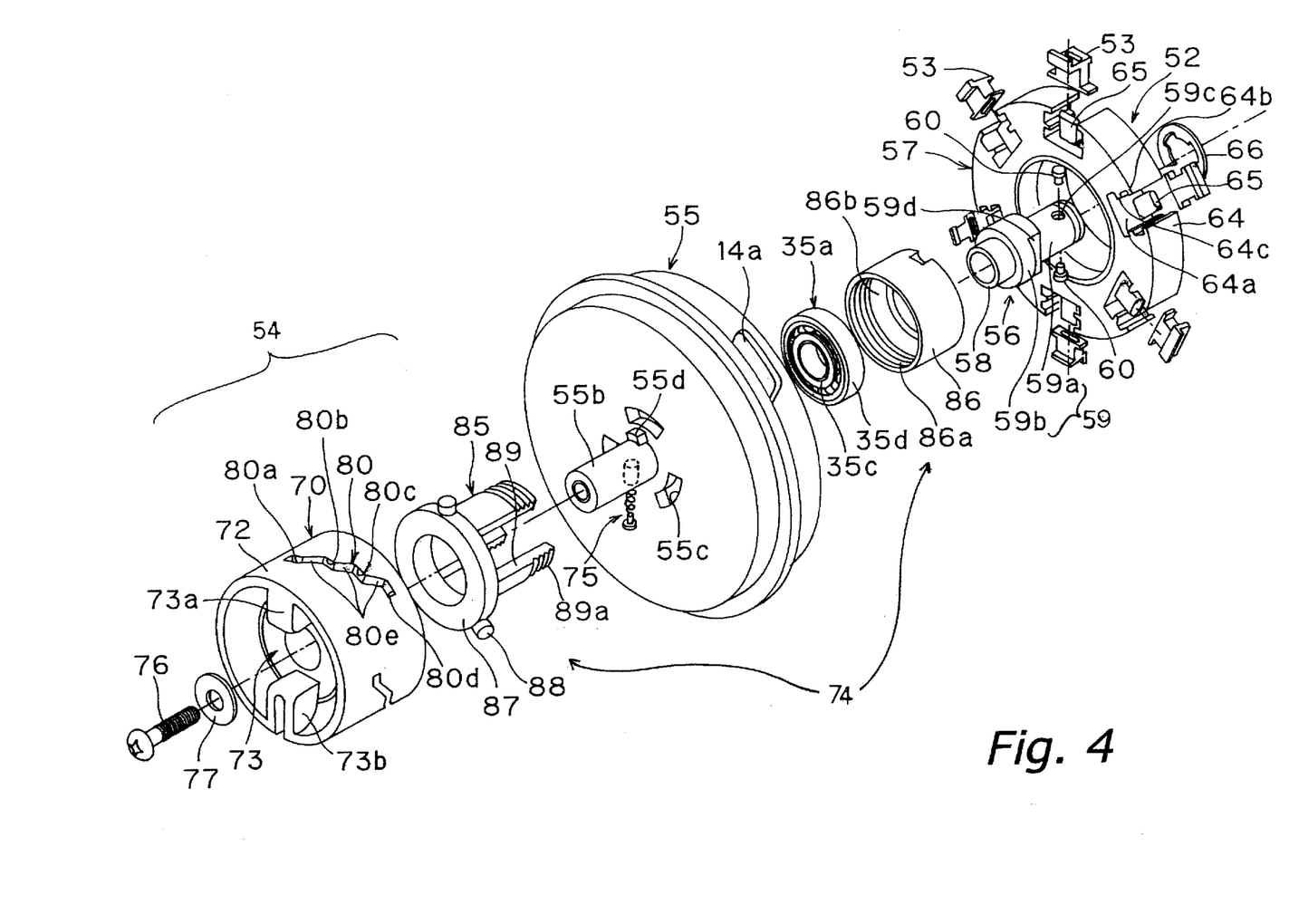
FIG. 4 is an exploded oblique view of the centrifugal braking mechanism of FIG. 2 and 3.

As shown in FIG. 3 and 4, the centrifugal braking mechanism 23 is provided with: a brake element 51 fixed to the reel unit 1; a rotor 52 disposed peripherally inward of and concentric with the brake element 51 and permitted to shift in the axial direction of the spool with respect to the reel unit 1; a plurality (for example, six) of shifting members 53 fitted to permit shift diametrically on the rotor 52; and a shifting mechanism 54 that shifts the rotor 52 back and forth in axial direction of the spool.

The brake element 51 is, for example, a thin cylindrical member made of a copper alloy and fixed to the inner peripheral surface of the brake case 55. On the inner peripheral surface of the brake element 51 is a cylindrical braking face 51a. The brake case 55 is a short cylindrical component having a base, and a cylindrical bearing guide 55a protruding inwardly is formed on the inner side of the base. An outwardly protruding knob support 55b is formed on the outer side of the base. The bearing 35a that supports the spool 16 is disposed, and the friction plate 47 of the casting control mechanism 22 is fitted, peripherally inward of the bearing guide 55a. The knob support 55b is furnished to rotatively support a braking knob 70 (described later) of the shifting mechanism 54. Three arcuate circularly spaced slots 55c are formed peripherally outward of the knob support 55b. A pivot-restricting nub 55d for restricting the amount the braking knob 70 pivots is formed on the base-rim outer periphery of the knob support 55b.

The brake case 55 is fixed to the first side cover 6 by a screw 49 (FIG. 2). That is, the brake case 55 forms a part of the reel unit 1. Three projections 14a that are components of the bayonet coupling 14 are formed circumferentially spaced on the outer surface of the brake case 55. Also, pawls 14b are formed on the opening 8a in positions opposite the projections 14a. The pawls are formed projecting 14b outwardly from the opening 8a.

The rotor 52 is a component that rotates linked with the spool 12. The rotor 52 includes a bushing member 56 and a guide mount 57. The bushing member 56 is non-rotatably fitted to the spool shaft 16 yet permitted axial travel. The guide mount 57 is non-rotatably, axially immovably fitted to the bushing member 56.

The bushing member 56, a cylindrical component for the most part, includes a smaller diameter press-fitting portion 58 that is press-fit into an inner race 35c of the bearing 35a, and an attachment section 59 having a larger diameter than the press-fitting portion 58. The press-fitting portion 58 is press-fit into the inner race 35c to maintain it in a non-rotatable, axially immobilized state. The inner peripheral surface of the press-fitting portion 58 is fitted rotatively to and permitted to shift axially on the spool shaft 16.

The inner surface of the attachment section 59 is disposed at gap with respect to the outer circumferential surface of the spool shaft 16. The attachment section 59 includes a small-diameter portion 59a onto which the guide mount 57 is fitted, and interlock portions 59b, larger in diameter than the small diameter portion 59a, by which the guide mount 57 is positioned and stopped against turning. A stepped through-hole 59c is formed diametrically through the small-diameter portion 59a, and a pair of turn-stop pins 60 is press-fit into the through-hole hole 59c for stopping the bushing member 56 against turning with respect to the spool shaft 16. The ends of the turn-stop pins 60 abut on parallel chamfered portions 16b formed opposing on the outer circumferential surface of the spool shaft 16. Accordingly, the bushing member 56 is fitted to be non-rotatable yet permitted axial shift with respect to the spool shaft 16. Parallel chamfered portions 59d are formed on the interlock portions 59b.

The guide mount 57 includes: a first cylindrical portion 61 non-rotatably fitted to the bushing member 56; a thin ring-shaped first circular plate portion 62 that extends radially outward from the outer periphery of the first cylindrical portion 61; a second-cylindrical portion 63 that extends axially outward from the outer periphery of the first circular plate portion 62; and a thick ring-shaped second circular plate portion 64 that protrudes radially outward from the circumferential face on the extended end of the second cylindrical portion 63.

Oblong holes 61a into which with the chamfered portions 59d of the bushing member 56 engage are formed on the inner periphery of the first cylindrical portion 61. The guide mount 57 is stopped from turning with respect to the bushing member 56 by the engagement of the chamfered portions 59d and the oblong holes 61a. One end (FIG. 3 left end) of the first cylindrical portion 61 abuts on the interlock portions 59b, in section in which the oblong holes 61a are formed, of the attachment section 59 of the bushing member 56. Further, the other end of the first cylindrical portion 61 abuts on a snap ring 66 fitted on the circumferential surface of the end of the small-diameter portion 59a. Accordingly, the guide mount 57 is axially immovable with respect to the bushing member 56. The first circular plate portion 62 is disposed leaving a clearance with the end of the bearing guide 55a of the brake case 55; the second cylindrical portion 63 is disposed leaving a clearance with the outer circumferential surface of the bearing guide 55a.

Formed at equal circumferential spaces on the outer periphery of the second circular plate portion 64 are six, for example, guide recesses 64a. The guide recesses 64a accommodate the shifting members 53 and at the same time are provided both for switching the shifting members 53 between a state in which they can come into contact with the brake element 51 and a state in which they cannot. A pair of projections 64b and 64c for restricting the travel of the shifting members 53 is formed on the opposing wall faces. Also, guide shafts 65 for guiding the shifting members 53 are formed on the bottoms of the guide recesses 64a, radiating diametrically.

The projections 64b are provided to prevent the shifting members 53 from dropping off of the guide shafts 65. The projections 64c are provided to keep the shifting members 53 from contacting the brake element 51.

Figure 5A:
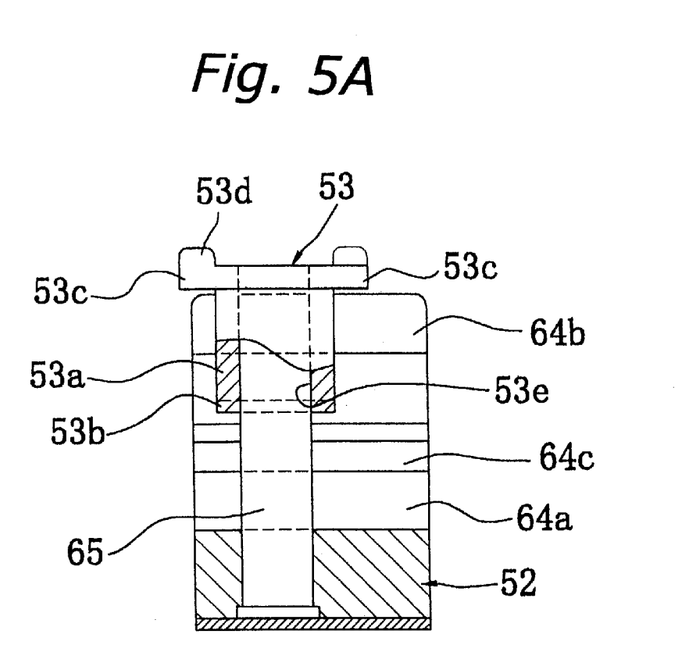
FIG. 5A and 5B are views, enlarged over FIG. 3, in section through a guide mount in the centrifugal braking mechanism, respectively showing orientations of shifting members as fitted onto guide shafts.
Figure 5B:
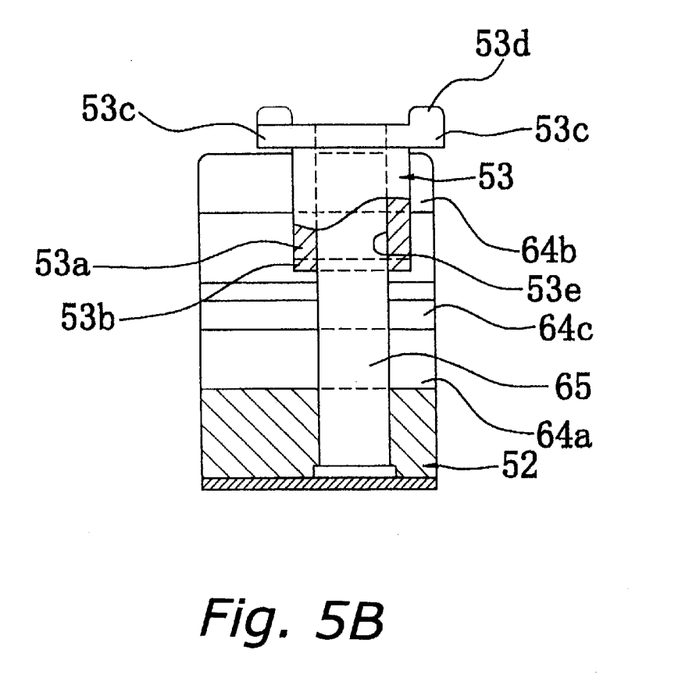

The guide shafts 65, shafts oval in cross-section, guide the shifting members 53 non-rotatably permitting diametric travel. As shown in FIG. 5, the guide shafts 65 are stood on the bottoms of the guide recesses 64a in either of two, for example, positions that differ in the spool axial direction. Accordingly, in contacting the brake element 51, the shifting members 53 are brought into contact with the brake element 51 in two categories of position in the spool axial direction.

The shifting members 53 are substantially rectangular components made of a synthetic resin. The shifting members 53 are provided on the rotor 52 permitting them to slide diametrically; different numbers of them are brought into contact with the brake element 51 by the rotor 52 shifting in the spool axial direction. The shifting members 53 include a body 53a, a pair of interlock projections 53b, and a pair of contact portions 53c. The body 53a has a rectangular shape and is guided by the guide shaft 65. The interlock projections 53b in the pair are formed integrally with and on the inward end (FIG. 5 downward end) of the body 53a, protruding in either rotational direction (orthogonal direction to the plane of the FIG. 5 sheet). The pair of contact portions 53c is formed integrally with and on the outward end (FIG. 5 upward end) of the body 53a, protruding in either direction axially of the spool (FIG. 5 left-and-right direction). An oval guide hole 53e penetrates the body 53a along the diametric direction of the spool shaft 16. The guide shaft 65 is fit into the guide hole 53e, whereby the shifting member 53 is permitted diametrical travel guided by the guide shaft 65. The interlock projections 53b protrude to interlock with the pair of projections 64b and 64c that are formed in the guide recesses 64a. Disposing the interlock projections 53b between the projections 64b and 64c interlocks them with the projections 64b to prevent the shifting members 53 from dropping out. Further, when they are pressed in radially inward and are disposed further inward than projections 64c, the interlock projections 53b interlock with the projections 64c and cannot come into contact with the brake element 51.

Therefore, the number of shifting members 53 that can contact the brake element 51 can be adjusted. A contact lip 53d protrudes radially outward from one of the pair of the contact portions 53c. The contact lip 53d is a protuberance that contacts on the inner circumferential surface (the braking face) of the brake element 51, and is formed into an arc in the circumferential direction (sheet-plane orthogonal) so as to follow the inner circumferential surface of the brake element 51.

By switching the way the shifting member 53 is fitted onto the guide shaft 65, the contact lips 53d come into contact with the brake element 51 in two different positions in the axial direction of the spool. Namely, a first position indicated by solid lines in FIG. 5A, and a second position indicated by dotted lines, fitted in a way opposite to the first position. Furthermore, because the guide shafts 65, as described earlier, are stood in the different positions in the spool axial direction, as indicated in FIG. 5B, the contact lips 53d contact on the brake element 51 at a third position (dotted lines) and a fourth position (solid lines), differing herein from the two positions shown in FIG. 5A. As a result, the contact lips 53d of the shifting members 53 come into contact with the brake element 51 at four different positions in the spool axial direction. Consequently, in this embodiment, the braking force is adjustable in four different stages. The four-stage braking force can be changed freely according to the direction of the shifting member 53 contact lips 53d (the way they are fitted on), or the number of shifting members 53 that can come into contact with the brake element 51. For example, in this embodiment, by shifting the rotor 52 axially, the number of shifting members 53 that come into contact with the brake element 51 switches in the order 6-4-3-1. The number of shifting members 53 that contact the brake element 51 at each stage can be changed freely, as just noted, according to the angler's preference or the type and weight of the lure used.

As shown in FIG. 3 and 4, the shifting mechanism 54 includes: the braking knob 70, provided to allow it to rotate in the reel unit 1; and a rotary cam mechanism 74 that converts rotation of the braking knob 70 into movement in the spool axial direction to shift the rotor 52 back and forth.

The braking knob 70 is fitted to the knob support 55b of the brake case 55, and rotatively fixed to the end of the knob support 55b by a bolt 76 screwed in via a washer 77. The braking knob 70 includes: a cylindrical boss section 71 fitted to the knob support 55b; a cylindrical cam section 72 disposed at a peripherally outward spacing from the boss portion 71; and a circular plate-shaped handle 73 that joins the boss portion 71 and the cam portion 72. Between the boss portion 71 and the knob support 55b a positioning mechanism 75 is fitted for positioning the braking knob 70 into four circumferentially directed positions. A cutout 71a is formed in the end of the boss portion 71 in a single circumferential location. By interlocking the pivot-restricting nub 55d formed on the knob support 55b into the cutout 71a, the extent of the braking knob 70 rotation is limited to, for example, a 75-degree range. Thick portions 72a are formed on the cam portion 72 in, for example, three circumferentially spaced locations. The thick portions 72a are formed bulging diametrically inward more than the other portions, and diametrically piercing cam grooves 80 that compose the rotary cam mechanism 74 are formed in each of the thick portions 72a.

The cam grooves 80 are formed roughly on a diagonal in the cam portion 72, and include four braking grooves 80a to 80d formed equidistantly at a predetermined circumferential length in positions differing axially and circumferentially, and diagonal-running grooves 80e that connect each of the braking grooves 80a to 80d.

The handle 73 includes two outwardly protruding protrusions 73a and 73b. An indicator 73c is formed in the one of these, by a groove in protrusion 73b in the radial direction. As shown in FIG. 1, numerals 1 to 4 are marked on the first cover 6 around the pointer 73c; the numeral to which the 73c indicator points expresses the degree of braking force.

The rotary cam mechanism 74 comprises a cam member 85 and a bearing support member 86. The cam member 85 includes a ring-shaped member 87, three cam pins 88, and three projections 89. The three cam pins 88 protrude outwardly from the outer surface of the ring-shaped member 87. The three projections 89 extend through the slots 55c to the inside of the brake case 55 from the ring-shaped portion 87. The ring-shape portion 87 is disposed peripherally outward of the boss portion 71 of the braking knob 70 and is supported to be axially shiftable on the boss portion 71. The rod-shaped cam pins 88 protrude for engagement in the cam grooves 80 formed on the thick portion 72a of the braking knob 70 at the boundary portion separating the thick portion 72a from other portions. That is, the protruding portion of the cam pins 88 is a little shorter in length than the difference in length between the thick portion 72a and the other portions. Each of the projecting portions 89 has an outer surface and an inner surface which form a part of a cylinder, and a male screw portion 89a is formed at an end of the outer surface. The projections 89 penetrate the slots 55c to make the cam member 85 non-rotatable with respect to the reel unit 1. Rotation of the braking knob 70 is converted to movement of the rotary cam mechanism 74 in the axial direction by the engagement of the cam pins 88 with the cam grooves 80. In addition, engagement of the cam pins 88 with the four braking grooves 80a to 80d, positions the rotary cam mechanism 74 into four axial locations.

The bearing support member 86, a cylindrical component, is fitted to the bearing guide 55a permitting it to shift axially. A female-threaded 86a portion is formed on the inner circumferential surface of the end of the bearing support member 86 and is engaged with the male-threaded portion 89a. The bearing support member 86 also has a housing space 86b continuous with the female threaded portion 86a for housing the bearing 35a. When the bearing 35a is housed in the housing space 86b and the bearing support member 86 is engaged with the cam member 85, the outer race 35d of the bearing 35a is held fixed by the bearing support member 86 and the cam member 85. Moreover, the bushing member 56 is press-fit to the inner ring 35c of the bearing 35a. Consequently, the rotary cam mechanism 74 and the rotor 52 are axially immovably coupled via the bearing 35a; shifting the rotary cam mechanism 74 axially shifts the rotor 52 axially via the bearing 35a, and the position wherein the shifting members 53 contact the brake element 51 changes in the axial direction. Therein, since the two are coupled via the bearing 35a, the components that are shifted axially do not turn even though the rotor 52 rotates. Accordingly, the rotating rotor 52 can be shifted axially in a simple configuration.

Herein, when the cam pin 88 is engaged with the braking groove 80a, the rotor 52 is positioned furthest from the spool 12, as shown in FIG. 3, and the number of shifting members that can come into contact with the brake element 51 is maximized. Hence, the braking force also reaches maximum. On the other hand, when the cam pin 88 is engaged with the braking groove 80d, the rotary cam mechanism 74 is advanced to the position shown in FIG. 6, positioning the rotor 52 nearest the spool 12. Hence, the number of shifting members 53 that can come into contact with the brake element 51 is minimized, minimizing the braking force.

Reel Operation

Figure 6:
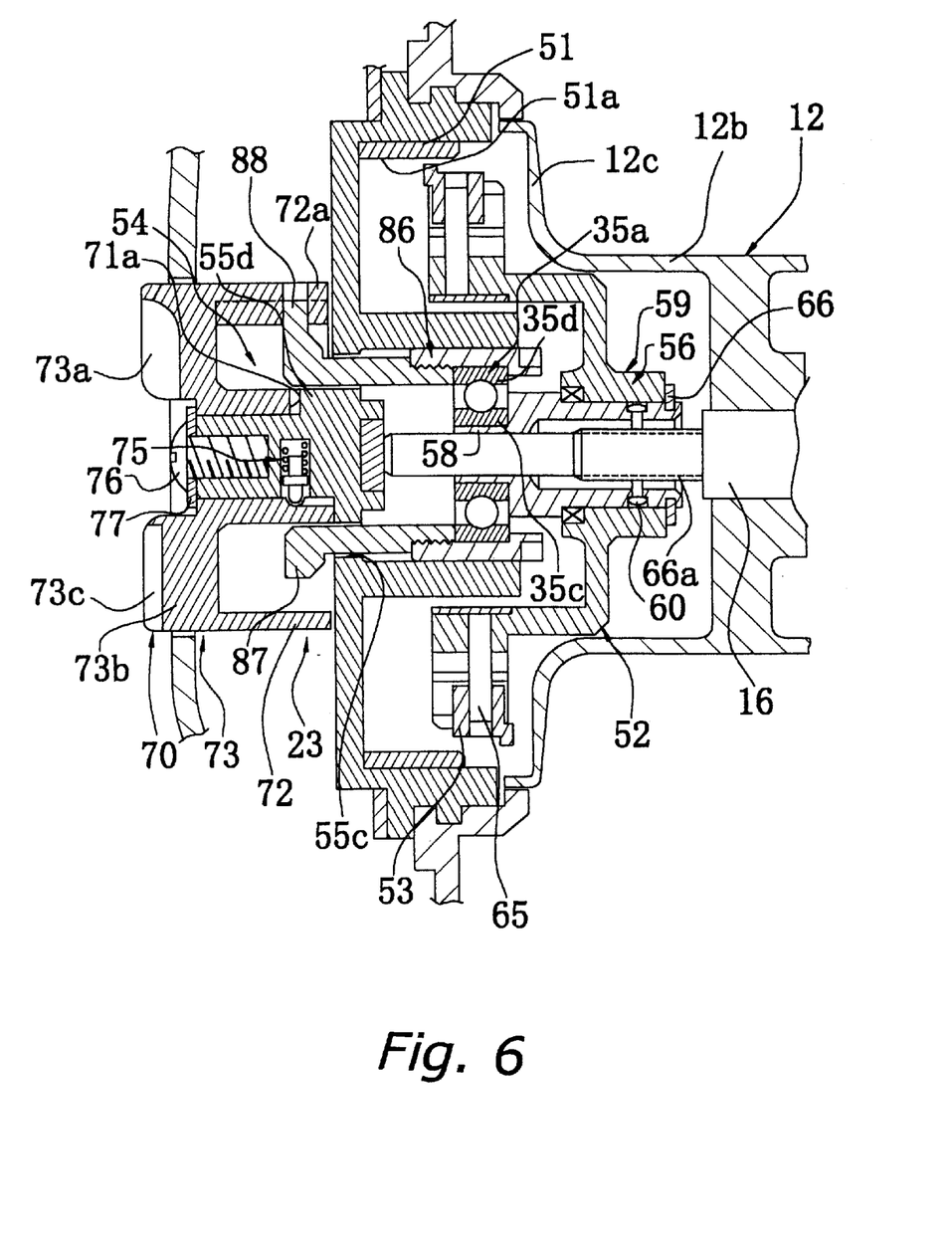
FIG. 6 is a view corresponding to FIG. 3, wherein the rotor has approached closest to the spool.

In a normal state, the clutch yoke 40 is pressed inwardly to achieve a clutch-on state. As a result, the rotational force from the handle 2 is transmitted to the spool 12 via the handle shaft 30, the main gear 31, the pinion gear 32 and the spool shaft 16 to rotate the spool 12 in the line reeling-in direction. At this time, although a centrifugal force is applied to the shifting members 53 of the centrifugal braking mechanism 23 to move the shifting members 53 outwardly in the radius direction, the braking force does not become so large since the rotation speed of the spool 12 is slow and, hence, it does not interfere with the rotation of the handle 2. However, if it is necessary to reduce the braking force, the braking knob 70 may be rotated so that the rotor 52 is placed at a position at which the braking force is weaker as shown in FIG. 6.

When a fishing line is cast, the braking force is adjusted to prevent backlash by rotating the braking knob 70. When the braking knob 70 is rotated in the direction indicated by an arrow A in FIG. 1, the rotary cam mechanism 74 is advanced towards the spool 12. Accordingly, the number of the shifting members 53 which make contact with the brake element 51 is gradually decreased and, hence, the braking force is gradually attenuated. When the braking knob 70 is rotated to the position where the pointer 73 indicates the numeral "1" the rotor 52 is placed at the position shown in FIG. 6 and the braking force is minimized.

Then, the clutch operation lever 17 may be pushed downwardly. The clutch yoke 40 is moved outwardly according to the movement of the clutch operation lever 17, and the pinion gear 32 is also moved in the same direction. As a result, the clutch is entered to a clutch-off state. In the clutch-off state, the rotation from the handle shaft 30 is not transmitted to neither the spool 12 nor the spool shaft 16, and the spool 12 may freely rotate. When a fishing rod is swung in the clutch-off state so that a reel is inclined in the axis direction in order for the spool shaft 16 to face a vertical surface while thumbing the spool using a thumb on the clutch operation lever 17, a lure is cast and the spool 12 rotates vigorously in the line-releasing direction.

In this state, the spool shaft 16 is rotated in the line-releasing direction by the rotation of the spool 12 and the rotation is transmitted to the rotor 52. When the rotor 52 is rotated, the shifting members 53 make contact with the brake element 51 and the spool 12 is braked by the centrifugal braking mechanism 23 to prevent a generation of backlash.

In addition, if backlash of the spool 12 is caused by any chance, the problem may be easily dissolved since the first side cover 6 is easily removed due to the bayonet structure 14.

Also, when a lure is changed to another lure having a different weight, the braking force is adjusted to one of the four levels by rotating the braking knob in accordance with the weight of the lure. In this embodiment, the braking force due to a centrifugal force may be easily adjusted by simply rotating the braking knob 70 which is exposed to outside. Also, since the number of the shifting members 53 which make contact with the brake element 51 is varied when the braking force is adjusted, a distinctive difference in the braking force may be obtained. Moreover, since the braking force is adjusted by moving the rotor 52 in the axial direction, the relative position between the rotor 52 and the brake element 51 in the spool axial direction does not change when the braking force is adjusted by the casting control mechanism 22. Thus, the braking force by the centrifugal braking mechanism 23 does not change.

Other Embodiments (a) Although the rotor 52 is moved by the rotary cam mechanism 74 in the above embodiment, it may be moved by using other converting mechanisms such as screws.

Figure 7:
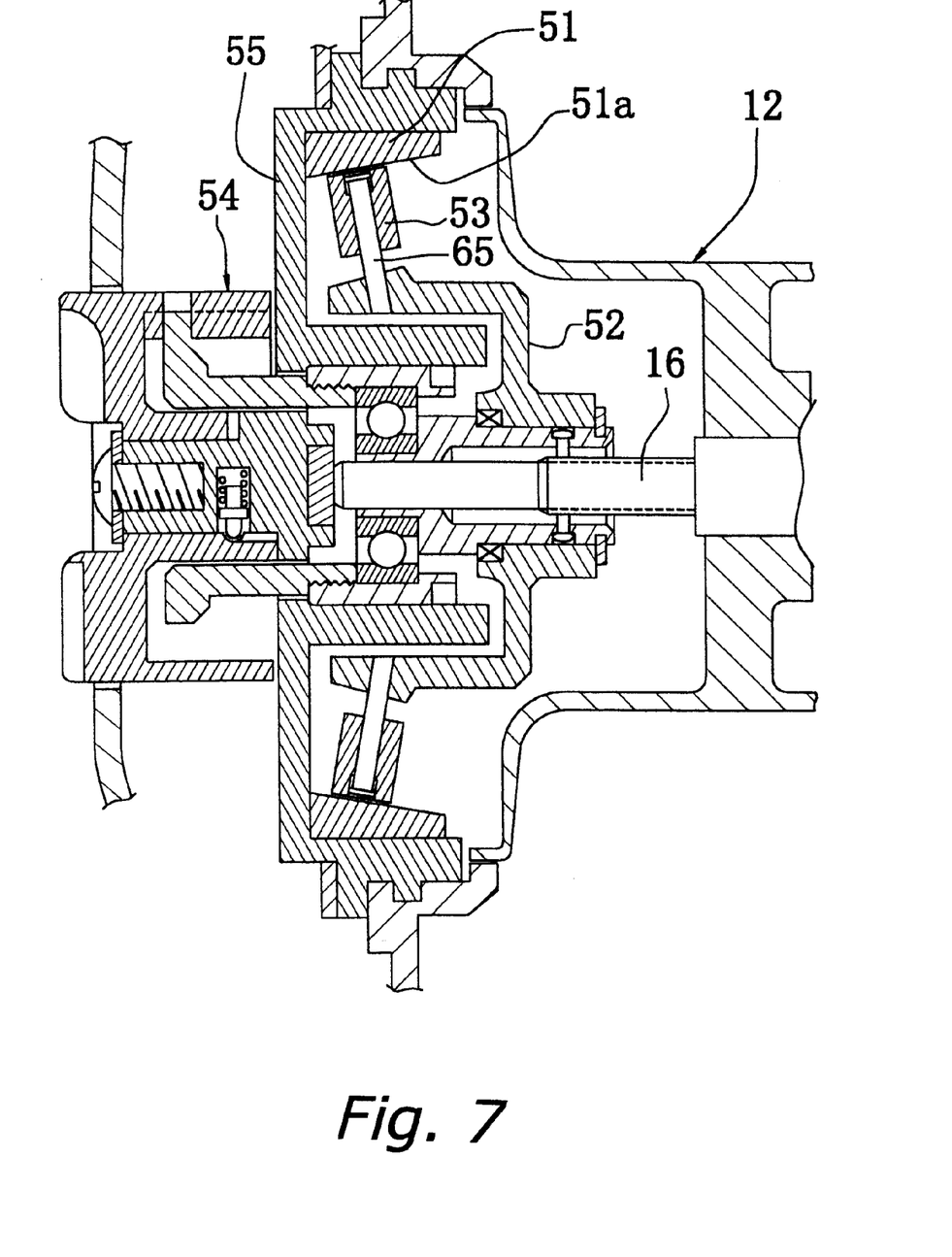
FIG. 7, 8 and 9 are views, corresponding to FIG. 3, each of respective other embodiments.

(b) As shown in FIG. 7, the guide shafts 65 may be attached to the rotor 52 slantwise in a radial manner and the degree of the movement of the shifting members 53 in the guiding shaft direction may be varied for each of the guide shafts 65. In such case, the braking surface 51a of the brake element 51 is a tapered inner surface of a cone shape. In this embodiment, also, the number of the shifting members 53 which make contact with the brake element 51 may be varied when the rotor 52 is moved in the-spool axial direction by the shifting mechanism 54 since a movement limit position differs for each of the shifting members 53.

Figure 8:
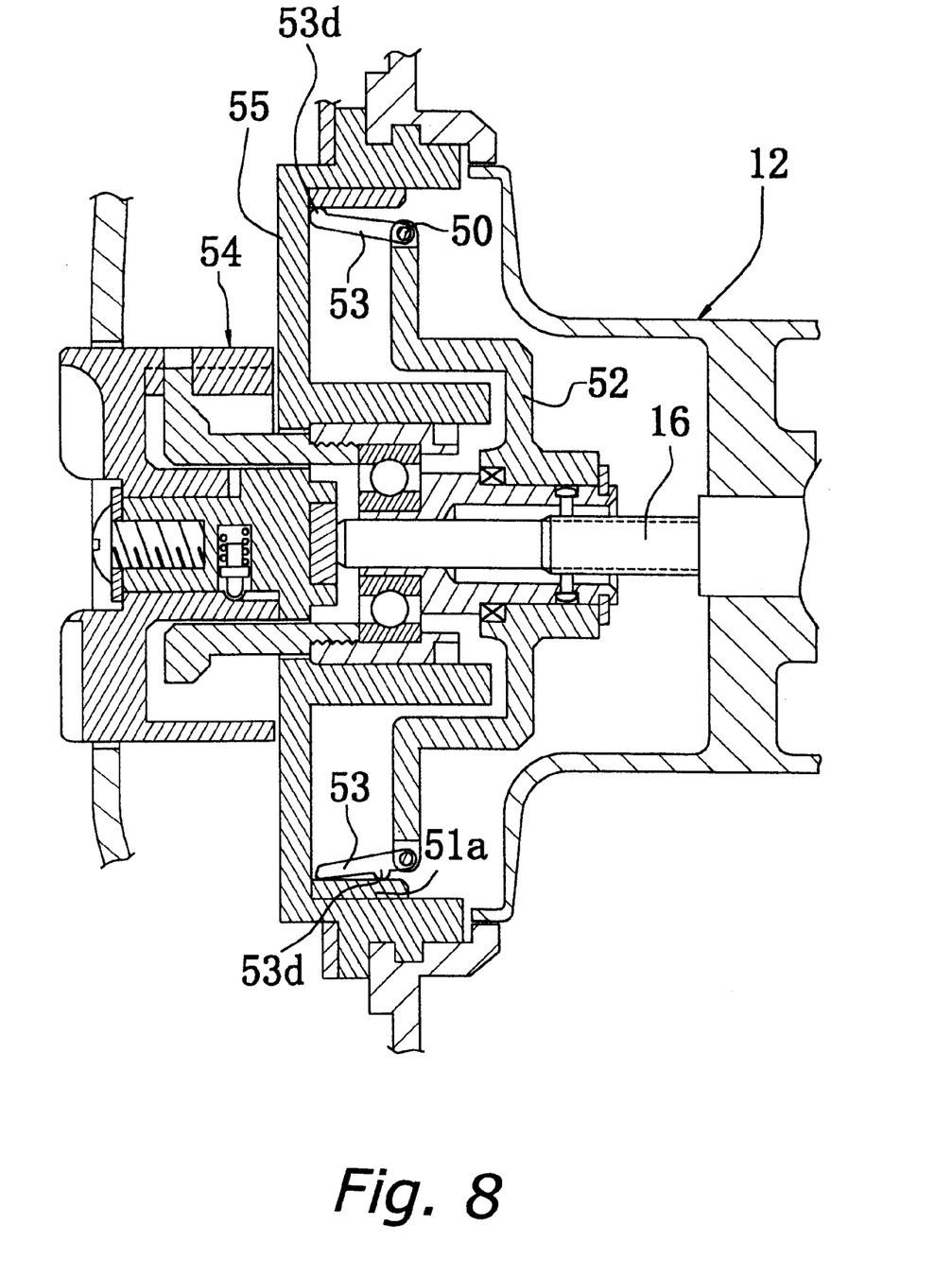

(c) As shown in FIG. 8, the plurality of the shifting members 53 may be attached to the rotating member 53 with a space between each other in the circumferential direction in a manner capable of pivoting around a respective pivot along a chord direction. In this embodiment, the contact lip 53d of a cylindrical shape which makes contact with the braking surface 51a of the brake element 51 is formed with the shifting member 53 at a different position for each of the shifting members 53. In this embodiment, also, the number of the contact lip 53d which makes contact with the brake element 51 is changed when the rotor 52 is moved in the axial direction so that the braking force may be adjusted.

Figure 9:
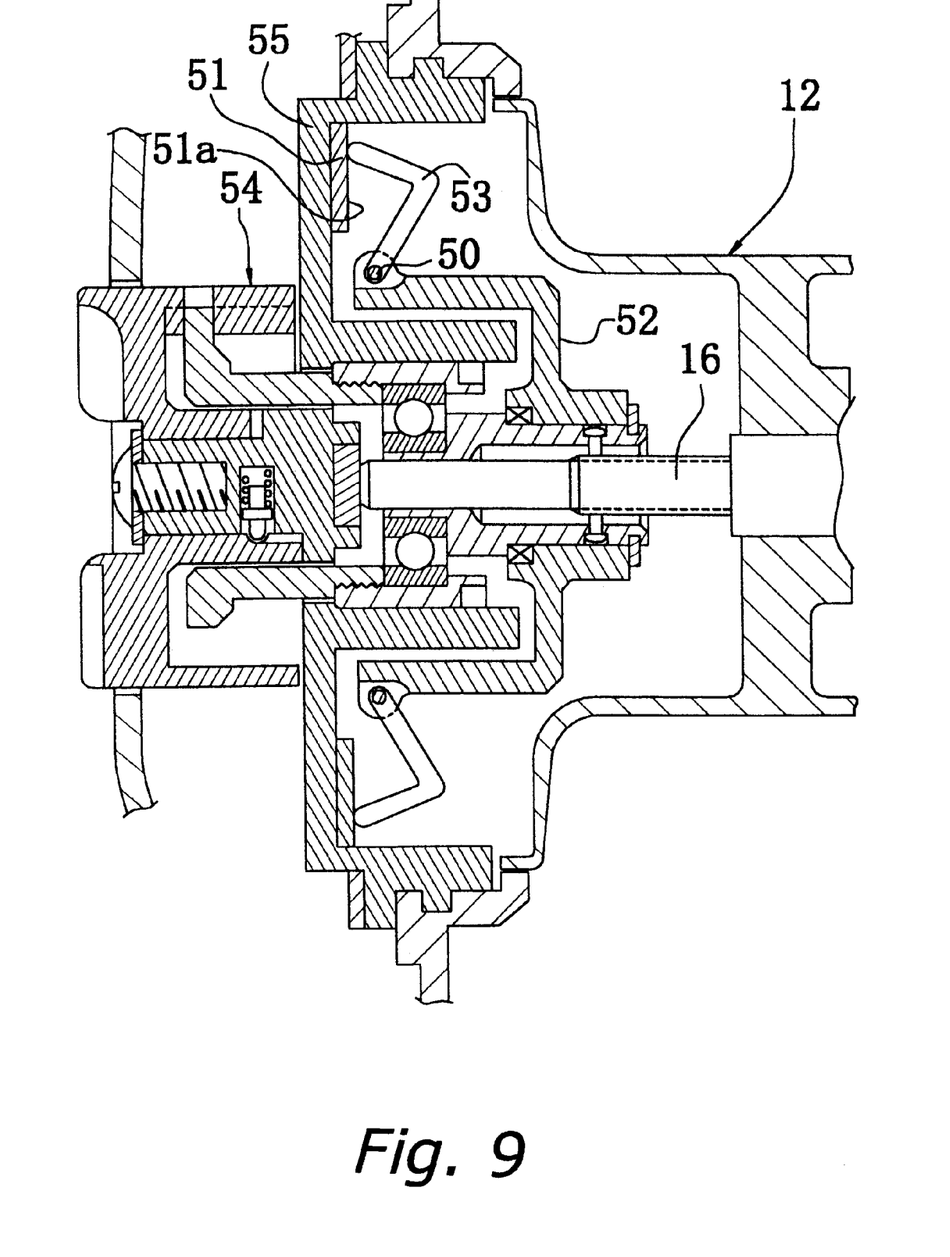

(d) As shown in FIG. 9, the braking member may be formed by a ring shaped member which is fixed to a surface of the brake case 55 and has a braking surface 51a of an annular shape orthogonal to the spool shaft. Also, the plurality of shifting members 53 may be attached to the rotor 52 with a space between each other in the circumferential direction in a manner capable of pivoting around a respective pivot 50 along a chord direction. In this embodiment, when the distance between the center of the pivot 50 of the pivoting shifting member 53 and the braking surface 51a of the brake element 51 is changed, the angle of the pivoting shifting members 53 with respect to the braking surface 51a that is created when the shifting members 53 make contact with the braking surface 51a is changed. Accordingly, moment generated by the centrifugal force which is applied to the center of gravity of the shifting members 53 is changed and, hence, the pressing force applied to the brake element 51 is varied to change the braking force.

(e) Although the spool shaft 16 is braked by the casting control mechanism 22 in the above-mentioned embodiment, it is possible to provide the casting control mechanism 22 and the centrifugal braking mechanism 23 with the level wind mechanism 15 when the level wind mechanism 15 is the one which rotates together with the spool 12.

According to the present invention, the friction state between the moving members and the braking member is changed in accordance with the position of the rotating member in the axial direction and the braking force is varied accordingly. Thus, an adjustment operation of the braking force may be carried out easily by moving the rotating member in the axial direction using the moving means. Also, since the rotating member is movable in a direction along the spool axial direction with respect to the reel body, it is also relatively movable with respect to the spool shaft. For this reason, if the spool shaft is moved in the axial direction due to such factors as the operation of the casting control mechanism, the rotating member does not move in the axial direction and the positional relationship between the rotating member and the braking member in the axial direction does not change. As a result, a predetermined braking force does not change if the spool shaft is moved and, hence, an adjustment operation of the braking force may be carried out with high accuracy.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. In a dual-bearing reel, a braking device for braking a spool provided rotatively in a reel body of the dual-bearing reel, the dual-bearing reel braking device comprising:

a brake member fixed to the reel body;

a rotor disposed concentric with said brake member, rotatingly linked with the spool and permitted to shift with respect to the reel body in a direction axially along the spool;

a plurality of shifting members provided on said rotor and permitted travel so as to shift toward said brake member under centrifugal force due to rotation of the spool, wherein during braking said rotor shifting in the axial direction enables said plurality of shifting members to come into contact as a whole with said brake member in differing frictional states; and a shifting means for shifting said rotor back and forth in the axial direction.

2. A dual-bearing reel braking device for as set forth in claim 1, said plurality of shifting members being disposed peripherally inward of said brake member circumferentially, and fitted to said rotor such that said rotor shifting in the axial direction changes numbers of shifting members coming into contact with said brake member.

3. A dual-bearing reel braking device as set forth in claim 2, wherein said brake member has a braking face spreading out in a direction nearing said shifting members; and said plurality of shifting members is radially fitted to said rotor permitting said shifting members to shift diametrically to mutually differing travel-limiting positions.

4. A dual-bearing reel braking device as set forth in claim 2, wherein said brake member has a cylindrical braking face; and said plurality of shifting members is radially fitted to said rotor permitting said shifting members to shift diametrically such that positions of contact onto said brake member differ in the axial direction.

5. A dual-bearing reel braking device as set forth in claim 2, said brake member having a cylindrical braking face; and the shifting members of said plurality being disposed circumferentially spaced on said rotor and fitted thereto to permit pivoting separately around pivot axes along chord directions thereof; wherein said shifting members contact said brake member in positions differing in the spool axial-direction.

6. A dual-bearing reel braking device as set forth in claim 1, said brake member having an annular braking face orthogonal to the spool axle, disposed at a spacing from said shifting members in the axial direction; and the shifting members of said plurality being disposed circumferentially spaced on said rotor and fitted thereto to permit pivoting separately around pivot axes along chord directions thereof; wherein said rotor shifting in the axial direction changes pressing force of the shifting members on said brake member.

7. A dual-bearing reel braking device as set forth in claim 1, wherein said spool is fixed to a spool spindle;

said rotor is non-rotatably and axially immovably fixed to an inner race of a bearing for supporting said spool rotatively with respect to said reel body, and said rotor is non-rotatably coupled to, yet permitted to shift axially on, said spool spindle; and said shifting means is non-rotatably and axially immovably coupled to an outer race of said bearing, and is for shifting said rotor back and forth in the axial direction via said bearing.

8. A dual-bearing reel braking device as set forth in claim 7, further comprising a casting control mechanism for braking said spool by gripping said spool spindle.

9. A dual-bearing reel braking device as set forth in claim 1, wherein said shifting means includes:

a pivoting member provided rotatively on said reel body; and a rotary cam mechanism for shifting said rotor by converting pivoting of said pivoting member into shifting in the spool axial direction.

10. A dual-bearing reel braking device as set forth in claim 8, further comprising a casting control mechanism for braking said spool by gripping said spool spindle.

11. In a dual-bearing fishing reel unit having a line-winding spool spinning on a spindle retained in opposing sides of the reel unit and including a casting control mechanism in one of the opposing sides for adjustably frictionally pressing on the spindle endwise, a centrifugal braking mechanism comprising:

a brake case fixedly fitted into the other of the opposing sides concentric with and pressing endwise on the spindle, said brake case inner peripherally having a centrifugal braking face;

a rotor linked to the spindle to permit axial travel on, yet be fixed against rotation relative to, the spindle, for rotation together with the spool;

a plurality of centrifugally shifting members supported on said rotor, said shifting members having braking-face contact portions adjustable according to axial position of said rotor for differential contact with said braking face under centrifugal force of the spool when spinning;

a shifting mechanism concentrically coupled to said rotor through a bearing carrying the spindle endwise, for shifting said rotor along the spindle, said shifting mechanism adjusting centrifugal braking force of the centrifugal braking mechanism by axially shifting said rotor into axial positions in which said shifting members as a plurality make differing centrifugal braking contact on said braking face; wherein axial position of said rotor relative to said braking face remains unchanged by casting control mechanism adjustment of frictional pressing force on the spindle as pinched between the casting control mechanism and said brake case.

* * * * *